United States Patent
Michelis et al.

(10) Patent No.: US 12,012,158 B2
(45) Date of Patent: Jun. 18, 2024

(54) WEIGHTING OF AN ASSISTANCE FUNCTION APPLICATION IN AN ASSISTED STEERING SYSTEM OF A VEHICLE

(71) Applicant: JTEKT EUROPE, Irigny (FR)

(72) Inventors: André Michelis, Chonas l'Amballan (FR); Luc Leydier, Feyzin (FR)

(73) Assignee: JTEKT EUROPE, Irigny (FR)

( * ) Notice: Subject to any disclaimer, the term of this patent is extended or adjusted under 35 U.S.C. 154(b) by 755 days.

(21) Appl. No.: 17/259,986

(22) PCT Filed: Jul. 9, 2019

(86) PCT No.: PCT/FR2019/051699
§ 371 (c)(1),
(2) Date: Jan. 13, 2021

(87) PCT Pub. No.: WO2020/012107
PCT Pub. Date: Jan. 16, 2020

(65) Prior Publication Data
US 2022/0204074 A1   Jun. 30, 2022

(30) Foreign Application Priority Data

Jul. 13, 2018 (FR) .................................. 18/56493

(51) Int. Cl.
*B62D 5/04* (2006.01)
*B62D 6/00* (2006.01)

(52) U.S. Cl.
CPC ............. *B62D 5/0463* (2013.01); *B62D 6/00* (2013.01)

(58) Field of Classification Search
CPC .............................. B62D 5/0463; B62D 6/00
See application file for complete search history.

(56) References Cited

U.S. PATENT DOCUMENTS 8,055,409 B2 * 11/2011 Tsuchiya ................ B62D 1/286
                                                              701/1
8,073,608 B2 * 12/2011 Hulten .................. B60T 8/1755
                                                             701/91
(Continued)

FOREIGN PATENT DOCUMENTS

CN     104843055 A    8/2015
EP       2907729 A2   8/2015
(Continued)

OTHER PUBLICATIONS

Dongpil et al "Robust steering-assist torque control of electric-power-assisted-steering systems for target steering wheel torque tracking" Feb. 2018 Mechatronics vol. 49 pp. 157-167 (Year: 2018).*
(Continued)

*Primary Examiner* — Gertrude Arthur Jeanglaude
(74) *Attorney, Agent, or Firm* — Oliff PLC

(57) ABSTRACT

A method for modulating an assistance function application of an assisted steering system in a vehicle, the vehicle including at least two wheels, a steering wheel and an assistance motor applying an assistance torque on a rack, the method implementing a step of evaluating an application gain of the assistance function, a step of estimating the assistance torque associated with the assistance function and a step of multiplying the assistance torque associated with the assistance function and the application gain, characterised in that the step of evaluating the application gain includes a first phase of determining a first gain depending on a yaw speed and an angle of the steering wheel.

9 Claims, 2 Drawing Sheets

(56) References Cited

U.S. PATENT DOCUMENTS

| | | | |
|---|---|---|---|
| 10,358,163 B2* | 7/2019 | Tsubaki | B62D 15/0285 |
| 10,577,016 B2* | 3/2020 | Naik | B62D 5/0484 |
| 2011/0320090 A1 | 12/2011 | Barthomeuf et al. | |
| 2015/0232120 A1 | 8/2015 | Aono | |
| 2017/0320517 A1 | 11/2017 | Michelis et al. | |

FOREIGN PATENT DOCUMENTS

| | | |
|---|---|---|
| JP | 2007-331569 A | 12/2007 |
| JP | 2008-183990 A | 8/2008 |
| JP | 2009-262686 A | 11/2009 |
| JP | 2017-001625 A | 1/2017 |
| WO | 2010/070229 A1 | 6/2010 |
| WO | 2016/083702 A1 | 6/2016 |

OTHER PUBLICATIONS

Nov. 18, 2019 International Search Report issued in International Patent Application No. PCT/FR2019/051699.

Nov. 18, 2019 Written Opinion issued in International Patent Application No. PCT/FR2019/051699.

* cited by examiner

WEIGHTING OF AN ASSISTANCE FUNCTION APPLICATION IN AN ASSISTED STEERING SYSTEM OF A VEHICLE

CROSS-REFERENCE TO RELATED APPLICATIONS

This application is the U.S. national phase of International Application No. PCT/FR2019/051699 filed Jul. 9, 2019, which in turn claims priority from French Patent Application No. 18/56493 filed Jul. 13, 2018.

The invention concerns the field of power steering systems and more particularly a method for modulating an application of an assistance function of a power steering system in a vehicle.

BACKGROUND OF THE INVENTION

A motor vehicle generally includes a steering system allowing a driver to modify a trajectory followed by the vehicle. To do this, the driver changes an angle of a steering wheel. The steering wheel is connected to a steering column, itself linked to a rack transforming the angle of the steering wheel into a translational movement making it possible to modify the orientation of the steered wheels of the vehicle, and thus perform a right bend or a left bend.

Subsequently, it will be considered that the steered wheels are positioned on a front portion of the vehicle. When the angle of the steering wheel is substantially zero, the steered wheels are substantially aligned with an elongation axis of the vehicle and the vehicle follows a straight line trajectory. By convention in the remainder of the document, when the driver turns the steering wheel in a negative direction, the angle of the steering wheel becomes negative, the steered wheels form a negative angle with the elongation axis of the vehicle and the vehicle performs a left bend. Conversely, when the driver turns the steering wheel in a positive direction, the angle of the steering wheel becomes positive, the steered wheels form a positive angle with the elongation axis of the vehicle and the vehicle makes a right bend.

In the case of a power steering system, the driver is helped in the modification of the trajectory by an assist motor which delivers an assist torque to the rack, thus facilitating the orientation of the steering wheel.

Depending on the weather conditions, the state of the road surface and the trajectory desired by the driver, different dynamic driving situations are defined for the vehicle.

The vehicle may be in a steering situation, that is to say a situation where the driver turns the steering wheel so that the angle of the steering wheel is other than zero, and the vehicle performs therefore a bend.

The vehicle may be in an over-steering situation, that is to say a situation in which the driver turns the steering wheel by an angle greater than the angle necessary to make the desired bend in a situation of normal grip of the steered wheels.

The vehicle may be in an off-steering situation, that is to say a situation in which the driver, after having steered or over-steered, turns the steering wheel in a direction opposite to the steering or over-steering direction without exceeding an angle of the steering wheel substantially equal to zero.

Finally, the vehicle may be in a counter-steering situation, that is to say a situation in which the driver, after having steered or over-steered, turns the steering wheel in a direction opposite to the steering or over-steering direction of an angle greater than an angle substantially equal to zero.

The driver is required to over-steer or counter-steer, for example, when the vehicle takes a trajectory that is not desired by the driver. In particular, when negotiating a bend, if the driver accelerates, there is a transfer of mass from a front portion to a rear portion of the vehicle along the elongation axis of the vehicle. This mass transfer has the consequence of relieving the front wheels of the weight of the vehicle which can cause them to drop out. The vehicle then performs what is known as understeer, which means that the angle of bend made by the vehicle is less than the angle of bend desired by the driver.

The driver is, for example, required to off-steer or counter-steer when the vehicle arrives too quickly at the entrance to the bend and decelerates suddenly to reduce its speed, there is a mass transfer from the rear portion to the front portion of the vehicle. This mass transfer has the effect of relieving the rear wheels of the weight of the vehicle, which can lead to a loss of grip on the road surface of the latter. A slight steering of the wheels towards the inside of the bend is then enough to lead the vehicle in a rotation movement in which the rear portion of the vehicle passes in front of the front portion. The vehicle then performs what is known as an oversteering or more commonly a «head to tail», that is to say that the angle of the bend made by the vehicle is greater than the angle of the bend desired by the driver.

In order to help the driver in controlling the trajectory of his vehicle, it is known to detect an under-steering or oversteering situation as early as possible as described in patents WO2010070229 and WO2016083702 and to apply assistance functions in correcting the trajectory of the vehicle.

Apart from the trajectory correction assistance functions, the power steering system comprises other assistance functions making it possible, for example, to correct mechanical steering imperfections or improve the feeling of the vehicle driving conditions. These include, for example, a return function in the center of the steering wheel intended to bring the angle of the steering wheel substantially to zero or a damping function intended to make a steering wheel feel and a vehicle dynamics as natural as possible.

It is known to modulate an application of these assistance functions on the power steering system by determining a compensation gain depending on a longitudinal acceleration and a lateral acceleration of the vehicle.

The lateral acceleration corresponds to the second derivative with respect to time of the instantaneous position of the vehicle along an axis transverse to the elongation axis of the vehicle, that is to say the vehicle acceleration when the latter performs a bend trajectory.

The longitudinal acceleration corresponds to the second derivative with respect to time of the instantaneous position of the vehicle along the elongation axis of the vehicle, that is to say the vehicle acceleration when the latter performs a straight line trajectory.

In this way, the assistance functions are applied according to the lateral and longitudinal acceleration of the vehicle, that is to say according to dynamic parameters of the vehicle.

BRIEF SUMMARY OF THE INVENTION

The aim of the invention is to improve the modulation of the application of the assistance functions so as to take into account all the dynamic driving situations, that is to say a steering, over-steering, off-steering and counter-steering situation.

To this end, the invention proposes a method for modulating an application of an assistance function of a power steering system in a vehicle, said vehicle comprising, at least two wheels, a steering wheel, an assist motor applying an assist torque to a rack, said method implementing a step of evaluating an application gain of said assistance function, a step of estimating the assist torque associated to said assistance function, and a step of multiplying the assist torque associated to said assistance function and the application gain, characterized in that the step of evaluating the application gain comprises a first phase of determining a first gain depending on a yaw rate and an angle of the steering wheel.

The assistance function to which the application gain is applied can be any assistance function integrated into the vehicle steering system and making it possible, for example, to correct a trajectory of the vehicle, to correct mechanical imperfections of the direction or to improve a feeling of the vehicle driving conditions. For example, a return function in the center of the steering wheel, or a damping function can be mentioned.

When the vehicle comprises several assistance functions, the method according to the invention determines as many application gains as there are assistance functions.

The method according to the invention allows a progressive application of an assistance function, that is to say a modulation, on the steering system depending on the dynamic driving situations, that is to say depending on a steering, over-steering, off-steering and counter-steering situation, and depending on the conditions of the vehicle grip on the road surface.

For example, when the vehicle performs a straight line trajectory on a low-grip road surface such as ice, the wheels grip the road surface poorly. In this situation, the driving torque is high but the longitudinal acceleration is low. If the road surface has high grip such as asphalt, the wheels grip strongly on the road surface and the longitudinal acceleration is important. Thus, depending on the vehicle grip conditions, certain assistance functions must be applied while others must not.

The yaw rate corresponds to the speed of a rotational movement of the vehicle about a vertical axis.

The first determining phase checks for consistency between the angle of the steering wheel and the yaw rate.

The application gain comprises a first gain depending on the parameters of the vehicle.

Said application gain is then multiplied by the assist torque associated with said assistance function so that to determine a weighted assist torque applied to the vehicle rack by the assist motor.

According to a characteristic of the invention, the first gain depends on the absolute value of the yaw rate, or on a theoretical angle calculated from the yaw rate and a vehicle speed, or on a theoretical lateral acceleration calculated from the yaw rate and the vehicle speed.

According to a characteristic of the invention, the first gain depends on the angle of the steering wheel or on a theoretical yaw rate calculated from the angle of the steering wheel and the vehicle speed.

According to a characteristic of the invention, the first gain depends on the angle of the steering wheel multiplied by the sign of the yaw rate, or on a theoretical yaw rate multiplied by the sign of the yaw rate calculated from the angle of the steering wheel and the vehicle speed.

Thus the first gain is represented by a three-dimensional graph.

According to a characteristic of the invention, the step of evaluating the application gain comprises a second phase of determining a second gain depending on a longitudinal acceleration of the vehicle.

The second gain is dependent on the parameters of the vehicle.

The second gain is represented by a two-dimensional graph with the x-axis representing the longitudinal acceleration and the y-axis representing the second gain.

According to a characteristic of the invention, the step of evaluating the application gain comprises a third phase of determining a third gain depending on a lateral acceleration of the vehicle.

The third gain, each gain is dependent on the parameters of the vehicle.

The third gain is represented by a two-dimensional graph with the x-axis representing the lateral acceleration and the y-axis representing the third gain.

According to a characteristic of the invention, the first gain, the second gain and the third gain are comprised between 0 and 1.

According to a characteristic of the invention, the step of evaluating the application gain consists in multiplying the first gain, the second gain and the third gain.

Thus, when one of the first gain, the second gain, or the third gain has a value of 0, the application gain is zero and therefore the weighted assist torque is zero, that is to say, the assistance function is not applied in this dynamic driving situation. When the first gain, the second gain and the third gain have a value of 1, the weighted assist torque is maximum, that is to say the assistance function is applied to the vehicle in this dynamic driving situation.

Subsequently, we will consider that the assistance function to which the application gain is applied is a direction return function making it possible to compensate for a pull torque phenomenon, also called «torque steer». The pull torque phenomenon appears when the at least two wheels are provided with a limited slip differential, or «self-locking differential» making it possible to transfer a driving torque, supplied by a driving motor of the vehicle, to the wheel having the lowest rotational speed, that is to say the wheel positioned inside a bend when the vehicle is making a turn, or both wheels if they have the same rotational speed or at the same wheel positioned outside the bend if the inside wheel is slipping. For example, when the vehicle is turned to the left, that is to say when the left wheel is positioned inside the bend, the left wheel goes slower than the right wheel, so it is the left wheel which receives the driving torque. If the left wheel slips, its speed increases until it reaches the speed of the right wheel. The driving torque is then transferred to the right wheel causing the pull torque phenomenon, that is to say a phenomenon of self-steering to the right. The pull torque phenomenon also appears when the vehicle performs a straight line trajectory and the wheels have a different grip on the road surface.

According to a characteristic of the invention, the method further comprises a step of calculating a compensation gain comprising a fourth phase of determining a fourth gain depending on a wheel torque of at least one of the two wheels.

Each wheel is subjected, on the one hand to a portion of the driving torque and, on the other hand, to friction forces linked to the followed trajectory and to the road surface. Thus, the forces exerted on a wheel can vary from wheel to wheel.

The wheel torque is a fraction of the driving torque received by said wheel.

The fourth gain is represented by a two-dimensional graph with the x-axis representing the torque with at least one wheel and the y-axis representing the fourth gain. The fourth gain represents an intensity of the pull torque phenomenon.

According to a characteristic of the invention, the fourth gain is comprised between 0 and 1.

According to a characteristic of the invention, the step of calculating a compensation gain comprises a fifth phase of determining a fifth gain depending on an angle of the steering wheel, and a difference in the rotational speeds of at least two wheels.

The fifth gain represents a probability of being in a driving situation that could lead to the appearance of the pull torque phenomenon.

According to a characteristic of the invention, the fifth determining phase depends on the angle of the steering wheel multiplied by the sign of a difference in the rotational speeds of the at least two wheels and on an absolute value of the difference in rotational speeds of at least two wheels.

Thus, the fifth gain is represented by a three-dimensional graph.

According to a characteristic of the invention, the fifth gain is comprised between 0 and 1.

According to a characteristic of the invention, the step of calculating the compensation gain consists in multiplying the fourth gain and the fifth gain.

The compensation gain is a gain comprised between 0 and 1. It continuously varies.

When one of, the fourth gain or the fifth gain, has a value of 0, the compensation gain is zero and therefore the weighted return torque is zero, that is to say a pull torque phenomenon is not detected, and when the fourth gain and the fifth gain have a value of 1, the weighted return torque is maximum, that is to say a pull torque phenomenon is applied to the vehicle.

The compensation gain is multiplied by the application gain and the assist torque associated with the return function in the multiplication step.

The method makes a continuous transition between a state in which the return function is fully active and a state in which the return function is inactive. In this way, a driver does not feel the activation or deactivation of the return function.

According to a characteristic of the invention, the wheel torque is determined as a function of the rotational speed of at least one of the two wheels, of an engine speed and of a driving torque supplied by the driving engine.

The number of rotations performed by the drive motor per unit of time is called engine speed.

The invention also relates to a power steering device of a vehicle comprising at least two wheels, a steering wheel, an assist motor applying an assist torque to a rack, a drive motor applying a wheel torque on the at least two wheels and implementing a method for modulating an application of an assistance function of a power steering system in a vehicle according to the invention.

BRIEF DESCRIPTION OF THE SEVERAL VIEWS OF THE DRAWINGS

The invention will be better understood, thanks to the description below, which relates to an embodiment according to the present invention, given by way of non-limiting example and explained with reference to the accompanying schematic drawings, in which.

DETAILED DESCRIPTION OF THE INVENTION

In the remainder of the description, a vehicle comprising a steering wheel allowing a driver to modify a trajectory followed by the vehicle as a function of an angle of the steering wheel $\alpha_D$ is considered. The steering wheel is connected to a steering column, itself linked to a rack transforming the angle of the steering wheel $\alpha_D$ into a translational movement making it possible to modify the orientation of two steered wheels, that is to say which makes it possible to modify a trajectory of a vehicle and are motor, that is to say arranged to transmit to a road surface all or part of a driving torque delivered by a vehicle engine in order to propel said vehicle, and thus perform a right bend or a left bend.

The driver is assisted in his intention to change the angle of the steering wheel $\alpha_D$ by an assist motor applying an assist torque to the rack.

Figure 1:
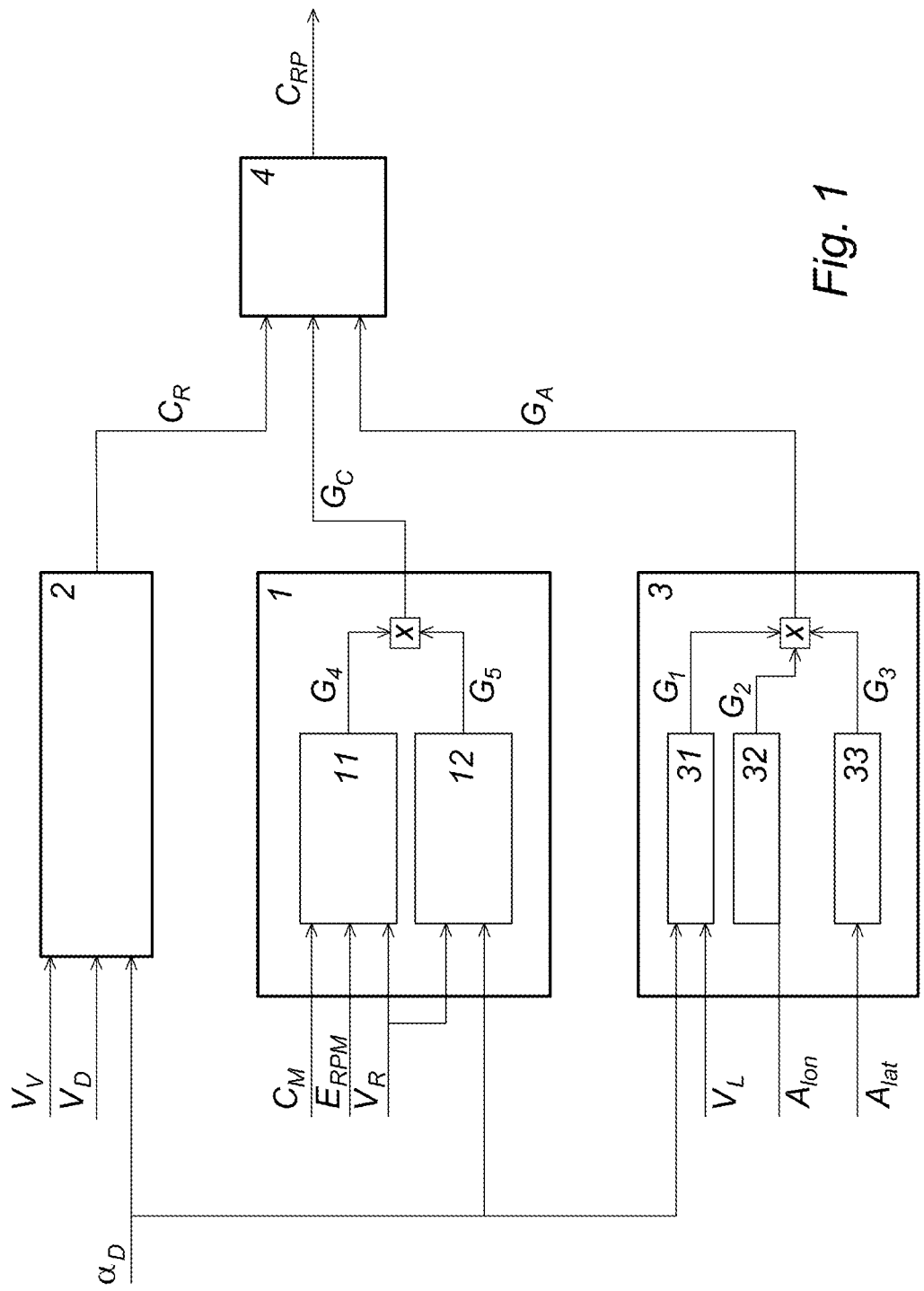
FIG. 1 is a schematic representation of the steps of a method according to the invention

FIG. 1 illustrates a method, according to the invention, for modulating an application of an assistance function of a power steering system in a vehicle. More specifically, FIG. 1 illustrates a method for modulating the application of a return function.

The return function makes it possible to apply an assist torque $C_R$ so as to compensate for a deviation of the angle of the steering wheel $\alpha_D$ imposed by a pull torque phenomenon which appears in certain vehicle driving situations.

The return function determines during a step of estimating 2 the assist torque associated with the return function $C_R$, the assist torque $C_R$ making it possible to compensate for the deviation of the angle of the steering wheel $\alpha_D$ imposed by the pull torque phenomenon. The estimation step 2 receives as input a vehicle speed $V_V$, the angle of the steering wheel $\alpha_D$, and a rotational speed $V_D$ of the steering wheel.

Moreover, the method determines a compensation gain $G_C$ during a step 1 of calculating the compensation gain $G_C$ comprising a first phase 11 of determining a fourth gain $G_4$ and a fifth phase 12 of determining a fifth gain $G_5$.

The fourth phase 11 receives as input a driving torque $C_M$ supplied by a driving motor of the vehicle making it possible to propel the vehicle, an engine speed $E_{RPM}$, that is to say the number of rotations performed by the driving motor per unit of time, and the rotational speed $V_R$ of the two wheels. The fourth phase 11 thus determines the fourth gain $G_4$ which is represented by a two-dimensional graph with the x-axis representing a wheel torque, that is to say the fraction of the driving torque $C_M$ received by the wheel, and the y-axis representing the fourth gain $G_4$. The fourth gain $G_4$ represents an intensity of the pull torque phenomenon. It is comprised between 0 and 1.

Figure 2:
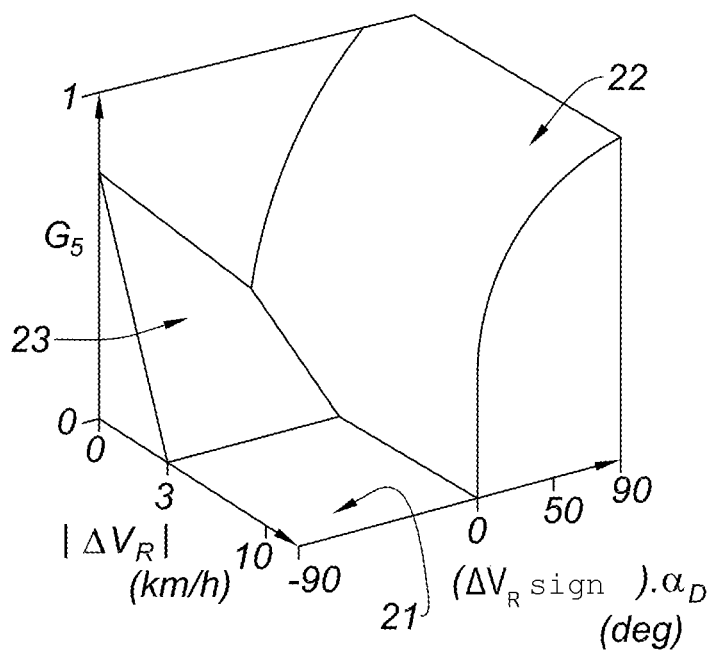
FIG. 2 is a three-dimensional graph representing a fifth gain according to the invention as a function of an angle of the steering wheel multiplied by the sign of a difference in the rotational speeds of two wheels of the vehicle and of an absolute value of the difference in the rotational speeds of the two wheels.

The fifth phase 12 receives as input the rotational speed $V_R$ of the two wheels and the angle of the steering wheel $\alpha_D$. The fifth phase 12 thus determines the fifth gain $G_5$ which is represented by a three-dimensional graph, as illustrated in FIG. 2, comprising on an x-axis an absolute value of the difference of the rotational speeds $|\Delta V_R|$ of the two wheels in kilometers per hour km/h, and on a dimension axis the angle of the steering wheel $\alpha_D$ multiplied by the sign of a difference in the rotational speeds of the two wheels ($\Delta V_R$ sign), which will hereinafter be called the angle of the signed steering wheel $\alpha_D$, in degrees deg.

More precisely, the fifth gain $G_5$ has, in a first zone 21, a value substantially equal to 0 when the vehicle is in a driving situation in which there is no risk of the appearance of the pull torque phenomenon.

Thus, it is determined that when the difference in the rotational speed $\Delta V_R$ between the wheels is important (greater than 3 km/h) and the angle of the signed steering wheel $\alpha_D$ is negative, there is no risk of appearance of the phenomenon of pulling torque. This first zone 21 represents a driving situation in which the vehicle makes a bend in one direction, for example a left bend in a driving direction of the vehicle, with the left wheel which has a rotational speed $V_R$ greater than the right wheel. Indeed, the transfer of the driving torque $C_M$ on the wheel having the lowest rotational speed $V_R$, that is to say the right wheel in our example, will promote the bend to the left of the vehicle.

The fifth gain $G_5$ has, in a second zone 22, a value substantially equal to 0 when the angle of the signed steering wheel $\alpha_D$ is substantially equal to 0 and has a value substantially equal to 1 when the signed steering wheel angle $\alpha_D$ is substantially equal to 1. In the second zone 22, the fifth gain $G_5$ increases continuously. The second zone 22 represents the vehicle driving situations in which there is a risk of the appearance of the pull torque phenomenon. Indeed, the more the angle of the signed steering wheel $\alpha_D$ increases, that is to say the more the vehicle makes a curved trajectory, the more the risk of the appearance of the pull torque phenomenon is important.

Furthermore, in a third zone 23, the fifth gain $G_5$ has a value substantially equal to 0 when the difference in the rotational speed $\Delta V_R$ between the wheels is small (less than 3 km/h) and the signed steering wheel angle $\alpha_D$ is negative, and has an increasing value up to 0.8 when the difference in the rotational speed $\Delta V_R$ between the wheels is equal to 0 km/h and the signed steering wheel angle $\alpha_D$ is equal to −90°. The third zone 23 represents the vehicle driving situations in which there is an average risk of the appearance of the pull torque phenomenon. In fact, the smaller the difference in speed between the wheels, the more the pull torque phenomenon can appear.

The fifth gain $G_5$, varying between 0 and 1, represents a probability of being in a driving situation that could lead to the appearance of the pull torque phenomenon.

The calculation step 1 of the compensation gain $G_C$ consists of multiplying the fourth gain $G_4$ and the fifth gain $G_5$.

Thus, when the fourth gain $G_4$ and/or the fifth gain $G_5$ has a value of 0, the compensation gain $G_C$ is zero, that is to say that a pull torque phenomenon is not detected, and when the fourth gain $G_4$ and the fifth gain $G_5$ have a value of 1, the compensation gain $G_C$ is equal to 1, that is to say that the pull torque phenomenon is applied on the vehicle.

The method also determines an application gain $G_A$ associated with the return function during a step 3 of evaluating an application gain $G_A$ comprising a first phase of determining 31 a first gain $G_1$, a second phase of determining 32 a second gain $G_2$ and a third phase 33 of determining a third gain $G_3$.

The third phase 33 receives as input a value of the lateral acceleration $A_{lat}$ of the vehicle. The third phase 33 thus determines the third gain $G_3$ which is represented by a two-dimensional graph with on the x-axis, the lateral acceleration $A_{lat}$ and on the y-axis, the third gain $G_3$ which varies between 0 and 1.

The lateral acceleration corresponds to the vehicle acceleration when it makes a trajectory in a bend.

The second phase 32 receives as input a value of the longitudinal acceleration $A_{lon}$ of the vehicle. The second phase 32 thus determines the second gain $G_2$ which is represented by a two-dimensional graph with on the x-axis, the longitudinal acceleration $A_{lon}$ and on the y-axis, the second gain $G_2$ which varies between 0 and 1.

The longitudinal acceleration $A_{lon}$ corresponds to the vehicle acceleration when it performs a straight line trajectory.

Figure 3:
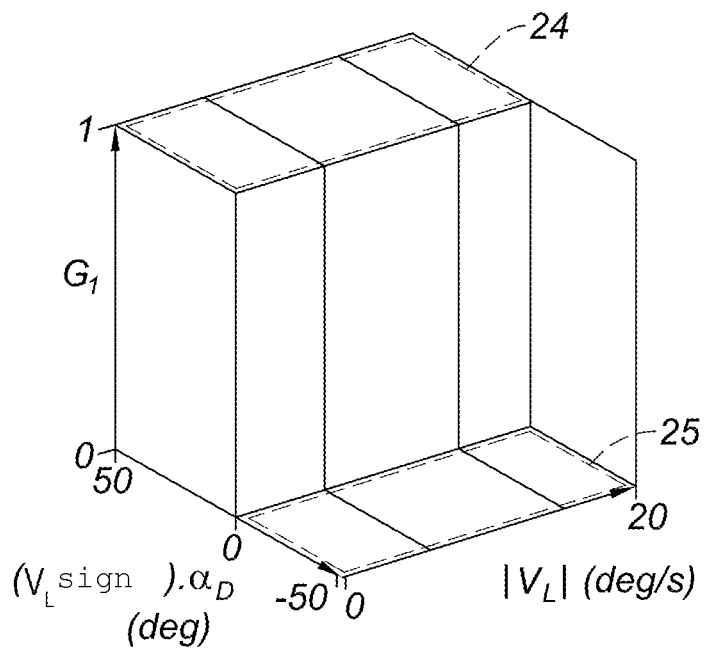
FIG. 3 is a three-dimensional graph showing a first gain according to the invention as a function of the steering wheel angle multiplied by the sign of a vehicle yaw rate and the absolute value of the yaw rate.

The first phase 31 receives as input the steering wheel angle $\alpha_D$ and a yaw rate $V_L$ of the vehicle. The first phase 31 thus determines the first gain $G_1$ which is represented by a three-dimensional graph, as illustrated in FIG. 3, comprising on an x-axis the angle of the steering wheel $\alpha_D$ multiplied by the signe of the yaw rate, which will be called the signed steering wheel angle $\alpha_D$ and on an axis of the dimensions the absolute value of the vehicle yaw rate $|V_L|$. The yaw rate $V_L$ corresponds to the speed of a rotational movement of the vehicle about a vertical axis.

More precisely, the first gain $G_1$ has, in a first zone 24, a value substantially equal to 1 when the angle of the signed steering wheel $\alpha_D$ is negative and has, in a second zone 25, a value substantially equal to 0 when the angle of the signed steering wheel $\alpha_D$ is positive.

The first gain $G_1$ illustrates a consistency between the angle of the steering wheel $\alpha_D$ and the yaw rate $V_L$.

The application gain $G_A$ is the multiplication of the third gain $G_3$, the second gain $G_2$ and the first gain $G_1$. The application gain $G_A$ is comprised between 0 and 1.

During a multiplication step 4, the assist torque associated with the return function $C_R$ is multiplied with the application gain $G_A$ and the compensation gain $G_C$ so as to obtain a weighted return torque $C_{RP}$.

Thus, the compensation gain $G_C$ modulates the application of the return function as a function of the intensity of the pull torque phenomenon applied to the vehicle and the application gain $G_A$ modulates the application of the return function as a function of a dynamic situation of the vehicle, that is to say a steering, oversteering, off-steering and counter-steering situation so as to take into account the conditions of the vehicle grip on the road surface.

The weighted return torque $C_{RP}$ allows a progressive application of the steering return function on the steering system only when a pull torque phenomenon occurs. Thus, the method performs a continuous transition between a state in which the return function is completely active, that is to say when the application gain $G_A$ and the compensation gain $G_C$ are equal to 1, and a state in which the return function is inactive, that is to say when the application gain $G_A$ and/or the compensation gain $G_C$ are equal to 0. In this way, a driver does not feel the activation or deactivation of the return function.

Of course, the invention is not limited to the embodiments described and represented in the accompanying figures. Modifications remain possible, in particular from the point of view of the constitution of the various elements or by substitution of technical equivalents, without departing from the scope of protection of the invention.

The invention claimed is:

1. A method for modulating an application of an assistance function of a power steering system in a vehicle, said vehicle comprising, at least two wheels, a steering wheel, an assist motor applying an assist torque on a rack, said method implementing a step of evaluating an application gain of said assistance function, a step of estimating the assist torque associated with said assistance function, and a step of multiplying the assist torque associated with said assistance function and the application gain, wherein the step of evaluating the application gain comprises a first phase of determining a first gain depending on:
   a yaw rate and
   an angle of the steering wheel multiplied by the sign of a yaw rate, or a theoretical yaw rate multiplied by the sign of the yaw rate calculated from the angle of the steering wheel and a vehicle speed,
   the method further comprising a step of calculating a compensation gain comprising a fourth phase of determining a fourth gain depending on a wheel torque of at least one of the two wheels.

2. The method according to claim 1, wherein the first gain depends on the absolute value of the yaw rate, or on a theoretical angle calculated from the yaw rate and on a vehicle speed, or on a theoretical lateral acceleration calculated from the yaw rate and the vehicle speed.

3. The method according to claim 1, wherein the first gain depends on the angle of the steering wheel or on a theoretical yaw rate calculated from the angle of the steering wheel and the vehicle speed.

4. The method according to claim 1, wherein the step of evaluating the application gain comprises a second phase of determining a second gain depending on a longitudinal acceleration of the vehicle.

5. The method according to claim 1, wherein the step of evaluating the application gain comprises a third phase of determining a third gain depending on a lateral acceleration of the vehicle.

6. The method according to claim 5, wherein the first gain, the second gain and the third gain are comprised between 0 and 1.

7. The method according to claim 5, wherein the step of evaluating the application gain consists in multiplying the first gain, the second gain and the third gain.

8. The method according to claim 1, wherein the step of calculating a compensation gain comprises a fifth phase of determining a fifth gain depending on an angle the steering wheel, and a difference in the rotational speeds of the at least two wheels.

9. A power steering device of a vehicle comprising at least two wheels, a steering wheel, an assist motor applying an assist torque to a rack, a driving motor applying a wheel torque on the at least two wheels and implementing a method for modulating an application of an assistance function of a power steering system in a vehicle according to claim 1.

* * * * *